Aug. 4, 1936.  P. KOPP  2,050,100
METHOD AND APPARATUS FOR THE PRODUCTION OF MOLDED ARTICLES
Filed Aug. 23, 1932

Inventor:
Peter Kopp,

Patented Aug. 4, 1936

2,050,100

UNITED STATES PATENT OFFICE 2,050,100

METHOD AND APPARATUS FOR THE PRODUCTION OF MOLDED ARTICLES

Peter Kopp, Berlin-Friedenau, Germany

Application August 23, 1932, Serial No. 630,122
In Germany December 22, 1931

7 Claims. (Cl. 18—12)

This invention relates to a method for the production of molded and hardened articles from artificial resin and artificial resin-containing mixes of every kind.

Methods are known for the production of rods, lasts, tubes and the like molded articles of any desired length and any desired profile, in which hardenable artificial resin, and artificial resin-containing mixes of every kind, particularly resol compression mixtures, are employed as starting material.

In these methods the pressure mold or pressure nozzle and pressure plunger possess substantially the form or shape of the compressed article to be prepared.

In general, therefore, the compression plungers, as well as the mold and the part of the mold in which the compression plunger travels, must be profiled corresponding to the cross section of the articles to be prepared. This method of procedure, however, renders the whole pressure mold more expensive, a fact which is of particular importance in the case of a complicated profile of the article under preparation, and also renders it difficult to keep the compression plunger and the mold clean. Moreover, the disadvantage results that in the production of articles having very slight cross-sectional strength or in the case of articles with a very complicated cross-sectional profile, compression plungers are rendered necessary with a wall strength which is in certain circumstances so slight that the plunger does not withstand the requisite high pressures and therefore breaks or becomes bent or the whole pressure mold, after a short time, becomes comparatively rapidly defective owing to the requirements which it has to fulfill.

It has now been found according to this invention that, in order to produce such articles of any desired length and the most varied profile, the use of a correspondingly profiled plunger can be dispensed with and simple unprofiled compression plungers with round, elliptical, quadratic or similar cross-sectional shapes may be employed, whereby the portion of the pressure mold in which the plunger slides also possesses this simple cross-sectional shape.

Accordingly the method of this invention is for the production of molded and hardened articles of any desired length and any desired profile, for example plates, rods, lasts, tubes and the like from artificial resins and artificial resin-containing mixes of every kind in a heated pressure mold which is open at the discharge end. The back pressure necessary for compression is exerted by the molded article itself, while passing out through the discharge end of the mold after compression has been effected, under the action of the pressure, the discharge end of the mold being at a higher temperature than the inlet end. This method is characterized in that the shaping, profiling or tube formation is initiated and carried out in the portion of the nozzle, and with the aid of profiling members introduced therein in which the compression mixture becomes plastic or liquid, the compression plunger and the portion of the pressure mold in which it slides having a simple cross-section.

The use of this simple plunger is rendered possible owing to the fact that the profiling of the article under preparation only begins in that zone of the discharge end of the open compression mold, in which the compression mass, owing to the high temperature and pressure, exists in a plastic or easily flowing condition but has not yet been converted into its final condition.

The shaping commences in the zone in which the material becomes plastic or easily flowing owing to the heat. The inlet zone is therefore maintained cold or is cooled. The shaping is effected by suitable members situated within the nozzle, as will be more exactly explained hereinafter with the aid of the accompanying drawing. The shape-imparting members are preferably so constructed that they offer as little resistance as possible to the unshaped material entering this portion, for example by being tapered, constricted and the like.

These members may also be so constructed that they extend as partition walls within the nozzle, whereby several molded articles of the same or different profile may be prepared in one operation with the aid of one pressure mold, one plunger and one filling space.

In order to produce very thin single or double articles, the filling space and the compression plunger may be considerably longer in cross-section than the cross section of the compressed article. The same, of course, applies when only one compressed article is prepared, since when carrying out the operation in this manner the compression plunger can be adapted to the pressures acting thereon.

The constriction in the compression mold must, however, be provided at the point where the compression material occurs in an easily flowing or plastic condition during the compression process (cf. Figure 2).

It has been further found that in the operation of producing endless articles, the requisite friction can also be obtained in another manner than by means of clamps or conical construction of the nozzle or the discharge end of the nozzle.

In this case a portion of the wall in the lower part of the nozzle is so cut away that the molded article is partially exposed (see Figure 1); the molded article thus still partially abuts against a part of the inner wall of the nozzle whilst at the exposed end of the molded article a clamp acts, which may be profiled and may completely enclose the exposed end of the molded article.

It has been found that such a profiled clamp can be so pressed against the exposed part of the molded article by means of screws or other suitable devices that the molded article is compressed against the opposite wall of the nozzle to such an extent that the resistance acting against the compression pressure and necessary for compression is obtained.

Several embodiments of the process will be described with the aid of the accompanying diagrammatic drawing.

Figure 1:
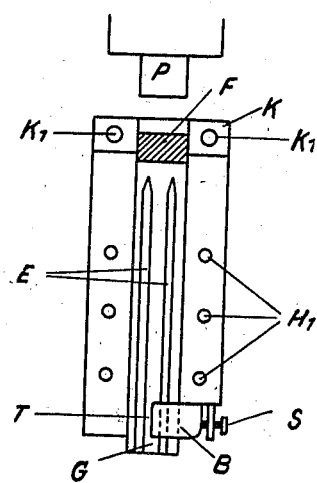
Figure 1 is an axial sectional view of one form of a mold, with an end view thereof.

Figure 1 represents diagrammatically a heated compression mold according to the invention, cooled at the inlet end. In the filling space F, which is cooled by the cooling jacket K by means of a medium flowing through the cooling pipe $K_1$, any desired hardenable compression mixture, i. e. a compression mixture in which hardening by the action of heat is still possible, is introduced in the form of tablets or powder. The compression plunger P is then pressed down. The compression mixture introduced is forced by this pressure into the next zone which is already slightly heated, through the heating jacket H which is heated by a heating medium flowing through the heating pipe $H_1$ or by means of electrical or any other kind of heating. The compression mixture then arrives at the position where the shaping or dividing of the molded article commences, indicated in the drawing by the profiling member E tapered at its upper end which is disposed on one side of the inner wall of the nozzle so that a piece profiled according to the illustrated cross-section results.

Here the material softens, i. e. it becomes easily flowing. The compression plunger is then again raised, a second charge of compression mass introduced into the cool inlet zone, the plunger again lowered, whereby the newly introduced material follows the same path as described hereinbefore and the previously introduced material which is already liquid is compressed together and extruded through the openings whereby in the further course of the continuous step by step process the mass is gradually converted by the temperature into its final condition.

The heating is with advantage so carried out that the final hardening takes place in the neighborhood of the discharge end and the temperature in this zone is highest whilst the inlet zone is with advantage cooled.

A temperature gradient is thus present in a direction opposite to that of the compression pressure.

In this case, it is in certain circumstances not necessary to cool the inlet zone direct. Care must, however, be always taken to ensure that the temperature in the inlet zone is not too high, so that premature hardening is avoided. The temperature gradient is so adjusted that thorough heating through of the material takes place in the space available, but premature hardening is avoided.

The process is continued until the compressed mass becomes visible at the projected portion T. By means of the clamp B, which is fastened in a suitable manner and can be pressed against the mass, for example, by means of a screw S, and which may be suitably profiled, such a pressure is exerted against the extruding portion of the molded article, that the mass in the pressure mold is compressed together by the compression plunger to such an extent that a homogeneous structure results, but the compressed article, owing to the excess pressure exerted by the compression plunger, can discharge.

In order to ensure the requisite back pressure from the start and to prevent the mass from flowing through the channels, it is advisable at the commencement of the operation to introduce a suitably profiled member, for example of metal, before introducing the first charge into the pressure mold, at the position where the final profiling commences. The shape of the member is so selected that it rubs against the channel walls and thereby exerts the necessary back pressure but is, nevertheless, gradually pushed through and out by the excess pressure of the compression plunger, after which the molded article itself fulfills its function of exerting the back pressure.

It should be further remarked that the clamping action can also be produced by other devices and that the clamping device may be disposed outside of the mold.

Figure 2:
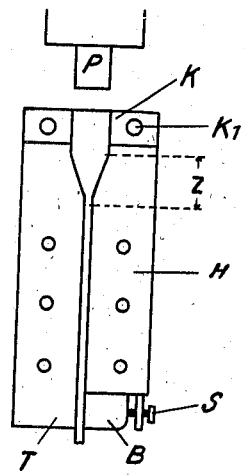
Figure 2 shows corresponding views of a second form of practicing the invention.

In Figure 2 a compression mold is illustrated diagrammatically in which the same reference letters represent the same parts as in Figure 1. The zone in which the material is converted into a plastic or easily flowing condition and in which the final shaping takes place, is further indicated by Z. The gradual constriction in the interior for the purpose of producing a slight resistance is also indicated.

Figure 3:
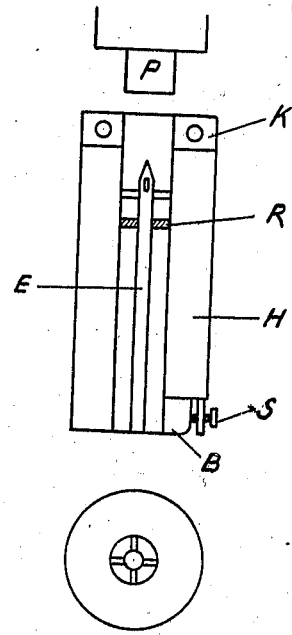
Figure 3 shows a third form of practicing the invention.

Figure 3 represents diagrammatically a compression mold for the production of tubes. The same reference letters again show the same parts as in Figures 1 and 2. In order to produce the aperture of the tube, a pin E is fixed in the, for example, round, quadratic or elliptical channel, which pin may also be round, quadratic or elliptical, in such a way that the cross section of the pin corresponds to the interior cross section of the tube.

The upper portion of this pin E is tapered in order to avoid unnecessary resistances and the pin is attached to the inner walls of the mold space at the point where the mass is still in an easily flowing and not hardened condition. The mass, after passing the detaining device, for example in the form of a cross or the like, thus again flows together. The detaining cross or the spokes of the detaining device are, with advantage, tapered in the direction of the plunger. R indicates the friction member inserted at the commencement and is in this case constructed in the form of a ring.

What I claim is:

1. An apparatus for the production of molded and hardened articles of any desired length and any desired profile from artificial resin and artificial resin containing solid mixes which are plasticized by warming and hardened by the action of heat and pressure, comprising a pressure mold having a receiving portion of simple cross-section and open filling and discharge ends and a mold passage between said receiving portion and the discharge end, an elongated removable profile-determining member located in and filling a portion of said passage and having a tapered end adjacent said receiving portion, means for cooling the filling end of the mold to prevent the hardening of the mix in said receiving portion prior to its formation by said member and mold, means for heating the mold adjacent the discharge end to establish a heat-pressure condition during the operation of a plunger for effecting a hardening to form-maintaining condition of the shaped mix, said heating means also operating for warming the mold adjacent the tapered ends of said member whereby to cause a plasticizing and union of the mix and shaping thereof by the mold and said member, a reciprocable plunger for compressing successively inserted solid portions of the mix and establishing thereby a continual movement of the material from the filling toward the discharge end, and means located beyond the heated portion of the mold for engagement with the hardened article for establishing a reaction against the movement of the material and thus producing the pressure for the heat-pressure condition.

2. An apparatus for the production of molded and hardened articles of any desired length and any desired profile from artificial resin and artificial resin containing solid mixes which are plasticized by warming and hardened by the action of heat and pressure, comprising a pressure mold having a receving portion of simple cross-section and open filling and discharge ends and a mold passage between said receiving portion and the discharge end, said mold being cut away to expose a lateral portion of said passage adjacent the discharge end, an elongated profile-determining member located in and filling a portion of the cross-section of said mold passage, means for cooling the filling end of the mold to prevent the hardening of the mix prior to its formation by said member and the adjacent parts of said mold, means for heating the mold adjacent the discharge end to establish a heat-pressure condition during the operation of a plunger for effecting a hardening to form-maintaining condition of the shaped mix, said heating means also operating for warming said mold passage between the cooled portion thereof and said discharge end whereby to cause a plasticizing and union of the mix and shaping thereof by the mold and said member, a reciprocable plunger for compressing successively inserted solid portions of the mix and establishing thereby a continual movement of the material from the filling toward the discharge end, a clamping block for the article conforming to the shape of the hardened article and located at the cut-away portion of the mold, and adjustable means for pressing said block at a right angle to the path of movement of said article whereby to regulate the friction of the molded article with the walls of said mold and with said block for restricting the movement of the material and thus establishing the pressure for the heat-pressure condition.

3. An apparatus for the production of molded and hardened articles of any desired length and any desired profile from artificial resin and artificial resin containing solid mixes which are plasticized by warming and hardened by the action of heat and pressure, comprising a pressure mold having a receiving portion of simple cross-section and open filling and discharge ends and a mold passage between said receiving portion and said discharge end, a pin located in said mold passage and spaced from the walls thereof, means for cooling the filling end of the mold to prevent the hardening of the mix prior to its formation by said mold and pin, means for heating the mold adjacent the discharge end to establish a heat-pressure condition during the operation of a plunger for effecting a hardening to form-maintaining condition of the shaped mix, said heating means also operating for warming the mold from said cooled portion toward the discharge end whereby to cause a plasticizing and union of the mix and shaping thereof by the mold and pin, means secured to the mold and pin and located wholly in said warmed portion for maintaining said pin in position whereby the shaping of the material is completed after it has passed said secured means and the shaping is independent of said secured means, a reciprocable plunger for producing a compressing and forward movement of the material from the filling toward the discharge end, and means located beyond the heated portion of the mold for restricting the movement of the hardened article being discharged from the mold whereby to produce the back pressure necessary for the hardening of the mix while in the mold.

4. A method for the production of molded and hardened articles of any desired length and any desired profile from artificial resin and artificial resin containing mixes which are plasticized by warming and hardened by the action of heat and pressure, which comprises preparing a mass of simple cross-section by successive step-by-step additions one upon another while maintaining the mass cooled, pressing the successive additions for advancing the mass bodily through a warming zone for plasticizing and uniting its parts to a uniform consistency while reducing and shaping the cross-section thereof, maintaining the mass during the time of uniting and shaping below the the temperature of hardening thereof, heating the shaped mass to a temperature above that of the heat-pressure condition for the hardening of the mass throughout its cross-section while continuing its advancement to provide an article of any desired length by the employment and uniting of the successive additions, and applying a regulated retarding effect to the movement of the hardened article whereby to produce by reaction the pressure for said heat-pressure condition.

5. A method of making molded and hardened articles of any desired length and any desired profile from artificial resin and artificial resin containing mixes which are plasticized by warming and hardened by the action of heat and pressure, which comprises introducing successive charges of the mix one upon another and thus preparing a mass of simple cross-section, pressing the successive charges and thereby advancing the mass in such simple cross-section while subjecting it to a limited warming to plasticize it and unite the parts thereof without hardening, shaping the advancing uniformly plastic mass to the desired cross-sectional profile while maintaining its temperature below the hardening point, increasing the temperature of the advancing shaped mass while maintaining the profile until the plastic mass is finally hardened to form the article, progressively discharging the hardened article, and restricting the movement of the discharged hardened article whereby to produce the back pressure effect in the shaping and hardening zones.

6. A method of making molded and hardened articles of any desired length and any desired profile from artificial resin and artificial resin containing mixes which are plasticized by warming and hardened by the action of heat and pressure, which comprises preparing a mass of the mix in an inlet zone by step-by-step additions one upon another and of simple cross-section, cooling the mass in the inlet zone, continually advancing the mass from the inlet zone and subjecting it in a warming zone to a limited warming to plasticize it gradually without hardening, contacting the periphery of the mass with a relatively stationary mold surface for effecting the uniting and shaping of the parts of the plasticized mass to the desired profile as it advances along the mold surface while maintaining its temperature below the hardening point during the time for shaping, increasing the temperature of the mass while maintaining its profile during continued movement along the mold surface during its advancement until the mass is finally hardened to form the article, and restricting the movement of the hardened article whereby to produce a back pressure effect competent of producing the uniting and shaping in said warming zone and the hardening in the zone of said increased temperature.

7. A method of making molded and hardened articles of any desired length and any desired profile from artificial resin and artificial resin containing mixes which are plasticized by warming and hardened by the action of heat and pressure, which comprises preparing a mass of the mix of simple cross-section in an inlet zone by step-by-step additions one upon another, cooling the mass in the inlet zone, pressing the mass after each addition for continually advancing the mass from the inlet zone and subjecting it initially to a limited warming to plasticize its parts without hardening, effecting the uniting and shaping of the parts of the advancing plastic mass to a uniform consistency and of the desired profile while maintaining its temperature below the hardening point during the time for shaping, increasing the temperature of the plastic mass while maintaining its profile during its advancement until the mass is finally hardened to form the article, and applying retarding forces to limited portions of the surface of the hardened article whereby to produce a back pressure effect competent of producing the hardening in the zone of said increased temperature.

PETER KOPP.